Aug. 7, 1934.   F. P. WHITAKER   1,969,535
ELECTRIC DISTRIBUTION SYSTEM EMPLOYING MERCURY ARC RECTIFIERS
Filed Dec. 17, 1932
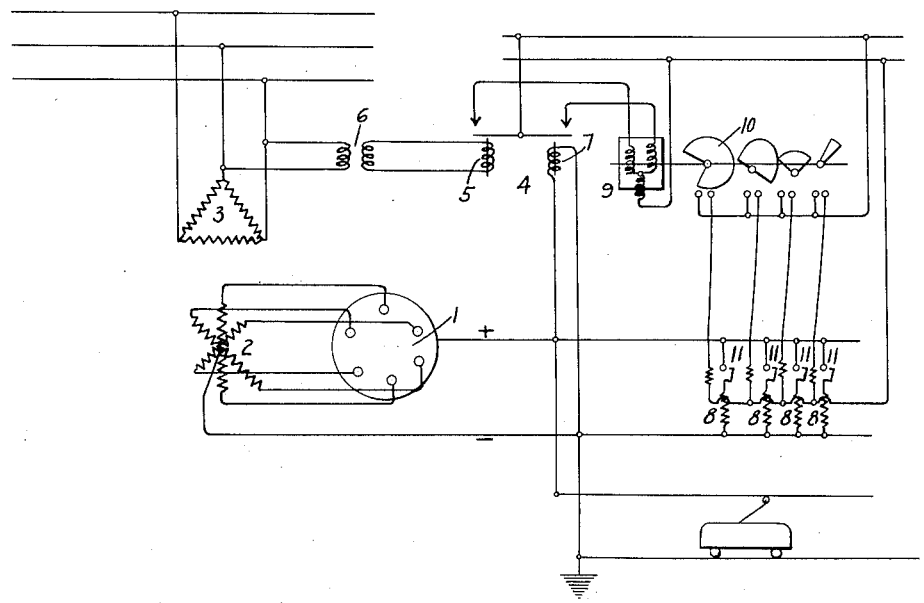
Inventor:
Frank P. Whitaker,
by Charles E. Tullar
His Attorney.

Patented Aug. 7, 1934

1,969,535

UNITED STATES PATENT OFFICE 1,969,535

ELECTRIC DISTRIBUTION SYSTEM EMPLOYING MERCURY ARC RECTIFIERS

Frank Percy Whitaker, Rugby, England, assignor to General Electric Company, a corporation of New York Application December 17, 1932, Serial No. 647,793
In Great Britain December 23, 1931

3 Claims. (Cl. 171—97)

This invention relates to electric distribution systems employing mercury arc rectifiers and more particularly to electric railways supplied from such rectifiers, where the trains are capable of regenerative control.

It is well known that these rectifiers while capable of supplying heavy loads in the forward direction cannot receive current from the line, so that without some special arrangement, regenerative control is not possible unless other trains are running on the section which can absorb the current being generated by the train descending the grade.

The object of this invention is to ensure that trains can generate at any time, and under any condition of load, and to that end it consists in automatically coupling a resistance across the direct current busbars during the time that the regenerative load would cause current to actually flow into the substation busbars.

This invention therefore consists in the provision of means by which a resistance may be connected to the busbars at the correct time and for just that period required, during which time the regenerative loads exceed the generated loads.

The accompanying drawing diagrammatically illustrates one method of carrying my invention into practice. As shown in this drawing I provide a rectifier 1 which supplies current to an electric railway line, the trains thereon being capable of regenerative braking. The rectifier 1 is supplied with current from the secondary winding 2 of a transformer, the primary winding 3 of which is connected to the alternating current bus-bars. A differential relay 4 has one coil 5 excited from the mains supplying the primary winding of the transformer through a potential transformer 6, the other coil 7 being excited from the direct current bus-bars supplied from the rectifier 1. This differential relay therefore measures the ratio between the alternating current and the direct current volts and can be utilized to detect when the regenerated load tends to be higher than the generated load, that is whenever the ratio of direct current voltage to the alternating current voltage is higher that the true no lead ratio. When this occurs the differential relay is utilized to insert gradually resistances 8 in sections across the direct current bus-bars until the ratio between the direct current and the alternating current voltages becomes approximately normal again. If on the other hand the ratio of direct current to alternating current voltage is lower than the true no-load ratio then the relay 4 operates to cause the sections of resistance 8 to be gradually cut out until if the generated load is higher than the regenerated load the resistance will be entirely cut out. The cutting out and in of the resistance sections 8 may be effected by means of a motor 9 the circuits of which are controlled by the relay 4, the motor operating a cam shaft 10 the cams on which are adapted to close the circuits of contactors 11 which connect the resistances 8 across the direct current bus-bars when closed.

With such a system of control, it will be seen that the minimum loss in the resistances will be incurred throughout a day's working. It will be seen further that when the differential scheme described above is used, the insertion and cutting out of the resistance sections can be made independent of alternating current voltage variations.

What I claim is:—

1. In combination, an alternating current circuit, an electric railway line and train apparatus thereon capable of regenerative braking, rectifier apparatus connected to the railway line to transmit power thereto from the alternating current circuit, resistance adapted to absorb current due to said regenerative braking, and means operating independently of voltage variations in said alternating current circuit for connecting said resistance to the railway line and disconnecting said resistance therefrom, said means comprising means for measuring the ratio between the voltage of the direct current output circuit of the rectifier apparatus and the voltage of the alternating current circuit, and switch means operatively associated with said differential relay for controlling the connection of said resistance to the railway line and the disconnection of said resistance therefrom in response to change in said ratio due to said regenerative braking.

2. In combination, an alternating current circuit characterized by a voltage which is variable over a substantial range, an electric railway line and train apparatus thereon capable of regenerative braking, rectifier apparatus connected to the railway line to transmit power thereto from the alternating current circuit, resistance adapted to absorb current due to said regenerative braking, and means operating independently of the voltage variation of said alternating current circuit for connecting said resistance to the railway line and disconnecting said resistance therefrom, said means comprising a differential relay for measuring the ratio between the direct current output voltage of the rectifier apparatus and the voltage of the alternating current circuit, and switch means operatively associated with said differential relay for connecting said resistance to the railway line when said ratio is higher than under no-load condition of the rectifier apparatus and to disconnect said resistance from the railway line when said ratio is lower than under no-load rectifier condition.

3. In combination, an alternating current circuit characterized by a voltage which is variable over a substantial range, an electric railway line and train apparatus thereon capable of regenerative braking, rectifier apparatus connected to the railway line to transmit power thereto from the alternating current circuit, resistance adapted to absorb current due to said regenerative braking, a differential relay having two windings excited respectively in response to the direct current voltage of the rectifier apparatus and to the voltage of the alternating current circuit for measuring the ratio of said two last-named voltages, and switch control means operatively associated with said differential relay and said resistance, said relay initiating operation of said switch control means independently of variation of said alternating current circuit voltage to connect said resistance progressively to the railway line when the value of said ratio is greater then under no-load condition of the rectifier apparatus and to disconnect progressively said resistance from the railway line when said ratio is lower than under no-load condition of the rectifier apparatus.

FRANK PERCY WHITAKER.